US006721337B1

(12) United States Patent
Kroeger et al.

(10) Patent No.: US 6,721,337 B1
(45) Date of Patent: Apr. 13, 2004

(54) METHOD AND APPARATUS FOR TRANSMISSION AND RECEPTION OF COMPRESSED AUDIO FRAMES WITH PRIORITIZED MESSAGES FOR DIGITAL AUDIO BROADCASTING

(75) Inventors: Brian William Kroeger, Sykesville, MD (US); Stephen Douglas Mattson, Felton, PA (US)

(73) Assignee: iBiquity Digital Corporation, Columbia, MD (US)

( * ) Notice: Subject to any disclaimer, the term of this patent is extended or adjusted under 35 U.S.C. 154(b) by 0 days.

(21) Appl. No.: 09/382,716

(22) Filed: Aug. 24, 1999

(51) Int. Cl.[7] .................................................. H04J 3/18

(52) U.S. Cl. ....................... 370/477; 370/468; 370/204; 370/312; 370/326

(58) Field of Search .................... 379/101.01; 375/222; 381/15, 2, 22, 23; 704/229; 714/784, 795

(56) References Cited

U.S. PATENT DOCUMENTS 4,379,947 A * 4/1983 Warner ....................... 370/204
4,425,642 A 1/1984 Moses et al.
4,534,054 A 8/1985 Maisel
4,660,193 A * 4/1987 Young et al. ............... 370/204
4,817,116 A 3/1989 Akaiwa et al.
4,866,719 A * 9/1989 Morgan et al. ............. 714/704
4,881,241 A * 11/1989 Pommier et al. ........... 375/260
4,881,245 A 11/1989 Walker et al.
4,998,252 A * 3/1991 Suzuki et al. ............... 714/756
5,020,076 A 5/1991 Cahill et al.
5,117,195 A 5/1992 Robbins
5,128,933 A 7/1992 Baranoff-Rossine
5,134,630 A 7/1992 Bateman
5,134,634 A 7/1992 Yoshida
5,251,232 A 10/1993 Nonami
5,265,128 A 11/1993 Widmer et al.
5,274,629 A 12/1993 Helard et al.
5,278,826 A 1/1994 Murphy et al.
5,278,844 A 1/1994 Murphy et al.
5,283,780 A * 2/1994 Schuchman et al. ........ 370/312
5,311,550 A 5/1994 Fouche et al.
5,315,583 A 5/1994 Murphy et al.
5,319,792 A * 6/1994 Ehlig et al. ................. 712/228
5,390,214 A 2/1995 Hopkins et al.
5,406,551 A 4/1995 Saito et al.

(List continued on next page.)

FOREIGN PATENT DOCUMENTS

WO WO97/49207 12/1997

OTHER PUBLICATIONS

Kroeger, Brian W., D.SC., "Improved IBOC DAB Technology for AM and FM Broadcasting," *Westinghouse Wireless*, pp. 1–14, Copyright 1996 USA Digital Radio.

(List continued on next page.)

*Primary Examiner*—Wellington Chin
*Assistant Examiner*—Jamal A. Fox
(74) *Attorney, Agent, or Firm*—Robert P. Lenart, Esq.; Pietragallo, Bosick & Gordon

(57) ABSTRACT

A method for transmission of compressed data for a digital audio broadcasting system comprises the steps of producing digital information representative of an audio signal; estimating the number of bits to be allocated to the digital information in a modem frame; encoding the digital information within the estimated number of bits to produce encoded data; removing selected bits from the encoded data; adding bits corresponding to digital messages to the encoded information to form a composite modem frame; formatting the composite modem frame bits to produce formatted composite modem frame bits; and transmitting the formatted composite modem frame bits. The invention also encompasses transmitters that perform the method.

39 Claims, 7 Drawing Sheets

U.S. PATENT DOCUMENTS

| | | | | | |
|---|---|---|---|---|---|
| 5,465,396 | A | | 11/1995 | Hunsinger et al. | |
| 5,499,271 | A | | 3/1996 | Plenge et al. | |
| 5,584,051 | A | | 12/1996 | Göken | |
| 5,588,022 | A | | 12/1996 | Dapper et al. | |
| 5,592,471 | A | | 1/1997 | Briskman | |
| 5,632,005 | A | * | 5/1997 | Davis et al. | 704/504 |
| 5,633,896 | A | * | 5/1997 | Carlin et al. | 375/340 |
| 5,673,292 | A | * | 9/1997 | Carlin | 375/269 |
| 5,682,461 | A | * | 10/1997 | Silzle et al. | 704/205 |
| 5,706,396 | A | * | 1/1998 | Schroder et al. | 704/228 |
| 5,826,227 | A | * | 10/1998 | Jayant | 704/229 |
| 5,850,456 | A | * | 12/1998 | Ten Kate et al. | 381/23 |
| 5,949,796 | A | | 9/1999 | Kumar | |
| 5,960,037 | A | * | 9/1999 | Ten Kate | 375/240 |
| 6,023,490 | A | * | 2/2000 | Ten Kate | 375/240 |
| 6,178,317 | B1 | * | 1/2001 | Kroeger et al. | 455/296 |
| 6,201,798 | B1 | * | 3/2001 | Campanella et al. | 370/326 |

OTHER PUBLICATIONS

Alard, M., Lassalle, R., "Principles of Modulation and Channel Coding for Digital Broadcasting for Mobile Receivers," *EBU Review—Technical*, Aug. 1987, pp. 168–190.

A.J. Vigil, "Wireless data transmission through in–band on–channel digital audio broadcasting", *SPIE*, vol. 2601, Jun. 1995, pp. 105–114.

C.P. Bell and W. F. Williams, "DAB: Digital Audio Broadcasting Coverage Aspects of a Single Frequency Network", *International Broadcasting Convention*, Conference Publication No. 358, Jul. 1992, pp. 270–276.

European Telecommunications Standards Institute, "Radio Broadcasting Systems; Digital Audio Broadcasting (DAB) to Mobile, Portable and Fixed Receivers" European Telecommunication Standard, May 1997, pp. 1–226.

* cited by examiner

METHOD AND APPARATUS FOR TRANSMISSION AND RECEPTION OF COMPRESSED AUDIO FRAMES WITH PRIORITIZED MESSAGES FOR DIGITAL AUDIO BROADCASTING

BACKGROUND OF THE INVENTION

This invention relates to methods and apparatus for transmitting and receiving digital data, and more particularly, to such methods and apparatus for use in digital audio broadcasting systems.

Digital Audio Broadcasting (DAB) is a medium for providing digital-quality audio, superior to existing analog broadcasting formats. Both AM and FM DAB signals can be transmitted in a hybrid format where the digitally modulated signal coexists with the currently broadcast analog AM or FM signal, or in an all-digital format without an analog signal. In-band-on-channel (IBOC) DAB systems require no new spectral allocations because each DAB signal is simultaneously transmitted within the same spectral mask of an existing AM or FM channel allocation. IBOC DAB promotes economy of spectrum while enabling broadcasters to supply digital quality audio to their present base of listeners. Several IBOC DAB approaches have been suggested. One such approach, set forth in U.S. Pat. No. 5,588,022, presents a method for simultaneously broadcasting analog and digital signals in a standard AM broadcasting channel. Using this approach, an amplitude-modulated radio frequency signal having a first frequency spectrum is broadcast. The amplitude-modulated radio frequency signal includes a first carrier modulated by an analog program signal. Simultaneously, a plurality of digitally-modulated carrier signals are broadcast within a bandwidth that encompasses the first frequency spectrum. Each digitally-modulated carrier signal is modulated by a portion of a digital program signal. A first group of the digitally-modulated carrier signals lies within the first frequency spectrum and is modulated in quadrature with the first carrier signal. Second and third groups of the digitally-modulated carrier signals lie outside of the first frequency spectrum and are modulated both in-phase and in-quadrature with the first carrier signal. Multiple carriers are employed by means of orthogonal frequency division multiplexing (OFDM) to bear the communicated information.

FM IBOC DAB broadcasting systems have been the subject of several United States patents including U.S. Pat. Nos. 5,465,396; 5,315,583; 5,278,844 and 5,278,826. One hybrid FM IBOC DAB signal combines an analog modulated carrier with a plurality of orthogonal frequency division multiplexed (OFDM) sub-carriers placed in the region from about 129 kHz to about 199 kHz away from the FM center frequency, both above and below the spectrum occupied by an analog modulated host FM carrier. An all-digital IBOC DAB system eliminates the analog modulated host signal while retaining the above sub-carriers and adding additional sub-carriers in the regions from about 100 kHz to about 129 kHz from the FM center frequency. These additional sub-carriers can transmit a backup signal that can be used to produce an output at the receivers in the event of a loss of the main, or core, signal.

One feature of digital transmission systems is the inherent ability to simultaneously transmit both digitized audio and data. Digital audio information is often compressed for transmission over a bandlimited channel. For example, it is possible to compress the digital source information from a stereo compact disk (CD) at approximately 1.5 Mbps down to 96 kbps while maintaining the virtual-CD sound quality for FM IBOC DAB. Further compression down to 48 kbps and below can still offer good stereo audio quality, which is useful for the AM DAB system or a low-latency backup and tuning channel for the FM DAB system. Effective compression schemes employ variable rate source encoding where fixed time segments of audio are encoded into digital packets of variable length, i.e. audio segments of varying "complexity" are converted into audio frames of varying length.

Audio frames generated by typical audio encoders are in formats that are not efficient for transmission as an IBOC DAB signal. There is a need for an efficient method for transmission and reception of compressed audio frames for digital audio broadcasting.

SUMMARY OF THE INVENTION

A method for transmission of compressed data for a digital audio broadcasting system comprises the steps of receiving digital information representative of an audio signal; estimating the number of bits to be allocated to the digital information in a modem frame; encoding the digital information within the estimated number of bits to produce encoded data; adding bits corresponding to digital messages to the encoded information to form a composite modem frame; formatting the composite modem frame bits to produce formatted composite modem frame bits; and transmitting the formatted composite modem frame bits.

The invention also encompasses modem frame formats produced by the method and transmitters that perform the method. The modem frame formats include a plurality of backup core audio fields, an enhanced audio/data field, and a header field. Each of the backup core audio fields includes a core audio frame, a cyclic redundancy check bit, a redundant header field, and flush bits.

DESCRIPTION OF THE PREFERRED EMBODIMENTS

Figure 1:
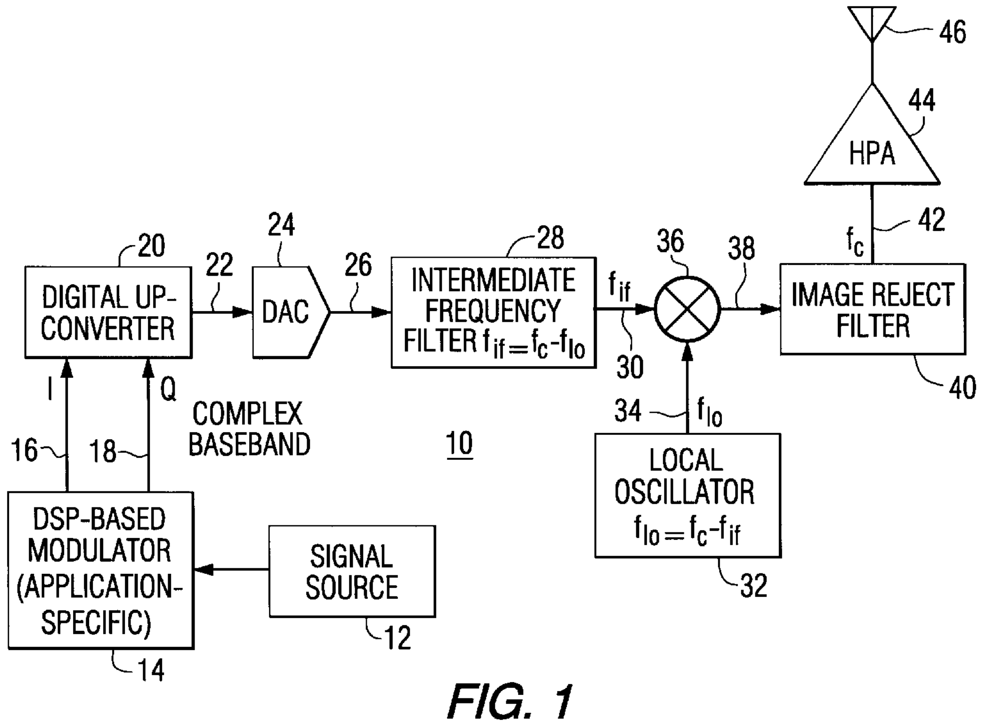
FIG. 1 is a block diagram of a transmitter for use in a digital audio broadcasting system that can transit signals formatted in accordance with this invention.

Referring to the drawings, FIG. 1, is a block diagram of a DAB transmitter 10 which can broadcast digital audio broadcasting signals in accordance with the present invention. A signal source 12 provides the signal to be transmitted. The source signal may take many forms, for example, an analog program signal that may represent voice or music and/or a digital information signal that may represent message data such as traffic information. A digital signal processor (DSP) based modulator 14 processes the source signal in accordance with various known signal processing techniques, such as source coding, interleaving and forward error correction, to produce in-phase and quadrature components of a complex base band signal on lines 16 and 18. The signal components are shifted up in frequency, filtered and interpolated to a higher sampling rate in up-converter block 20. This produces digital samples at a rate $f_s$, on intermediate frequency signal $f_{if}$ on line 22. Digital-to-analog converter 24 converts the signal to an analog signal on line 26. An intermediate frequency filter 28 rejects alias frequencies to produce the intermediate frequency signal $f_{if}$ on line 30. A local oscillator 32 produces a signal $f_{lo}$ on line 34, which is mixed with the intermediate frequency signal on line 30 by mixer 36 to produce sum and difference signals on line 38. The sum signal and other unwanted intermodulation components and noise are rejected by image reject filter 40 to produce the modulated carrier signal $f_c$ on line 42. A high power amplifier 44 then sends this signal to an antenna 46.

The method of this invention involves the efficient and robust multiplexing of compressed digital audio along with data messages of varying priority, or time urgency, requirements. A basic unit of transmission of the DAB signal is the modem frame, which is on the order of a second in duration. This duration is required to enable sufficiently long interleaving times to mitigate the effects of fading and short outages or noise bursts such as may be expected in a digital audio broadcasting system. The delay for the main digital interleaved audio channel can be no less than the duration of the modem frame. However, this delay is not a significant disadvantage since one IBOC DAB system in which the invention may be used already employs a diversity delay technique, which intentionally delays the digital signal for several seconds with respect to the analog signal. A DAB system which includes time diversity is described in commonly owned U.S. patent application Ser. No. 08/947,902, filed Oct. 8, 1997, now U.S. Pat. No. 6,178,317. All analog or digital time diversity signal is provided for fast tuning acquisition of the signal. Therefore the main digital audio signal is processed in units of modem frames, and any audio processing, error mitigation, and encoding strategies should be able to exploit this relatively large modem frame time without additional penalty.

In this invention, a format converter is used to repackage the compressed audio frames in a manner that is more efficient and robust for transmission and reception of the IBOC signal over the radio channel. A standard commercially available audio encoder can initially produce the compressed audio frames. An input format converter removes unnecessary information from the audio frames generated by the audio encoder. This unnecessary information includes frame synchronization information as well as any other information, which can be removed or modified for DAB audio transmission without impairing the audio information. An IBOC DAB modem frame assembler reinserts synchronization information in a manner that is more efficient and robust for DAB delivery. A format converter at the receiver repackages the recovered audio frames to be decoded by a standard audio decoder.

Both the AM and FM IBOC DAB systems arrange the digital audio and data in units of modem frames. The systems are both simplified and enhanced by assigning a fixed number of audio frames to each modem frame. A scheduler determines the total number of bits allocated to the audio frames within each modem frame. The audio encoder then encodes the audio frames using the bit allocation for that modem frame. The remaining bits in the modem frame are consumed by the multiplexed data and overhead.

Figure 2:
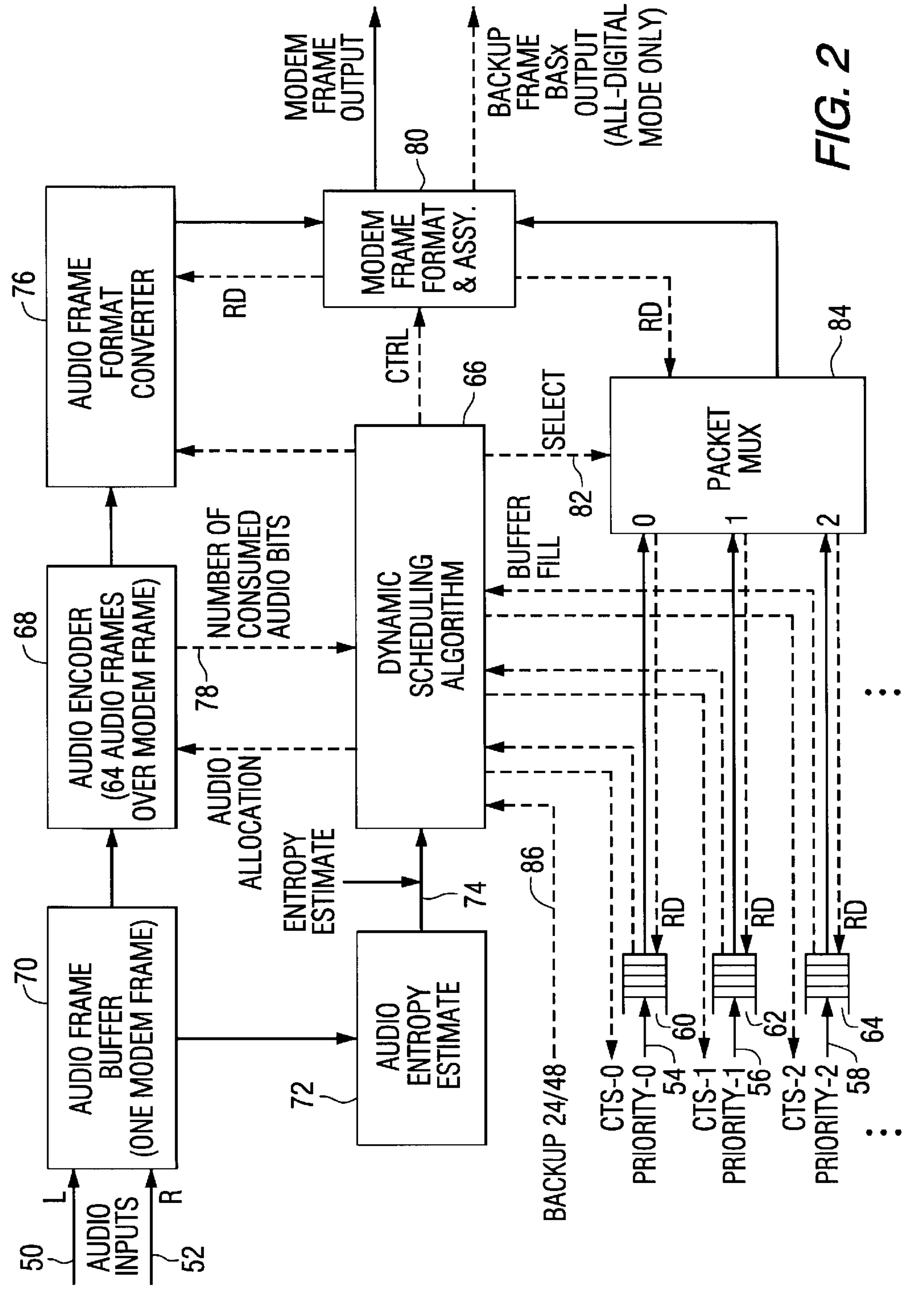
FIG. 2 is a functional block diagram illustrating the method of multiplexing and encoding audio and prioritized data packets in accordance with this invention.

A functional block diagram of the process for assembling a modem frame is presented in FIG. 2. The functions illustrated in FIG. 2 can be performed in block 14 of FIG. 1. In this embodiment of the invention, left and right audio DAB programming signals are supplied on lines 50 and 52. Data messages (also referred to as auxiliary data) having various levels of priority are supplied on lines 54, 56 and 58, and stored in buffers 60, 62 and 64. A dynamic scheduling algorithm 66, or scheduler, coordinates the assembly of the modem frame with an audio encoder 68. The amount of auxiliary data that may be transmitted is determined by multiple factors. In the preferred embodiment, the audio encoder first scans the audio content of the audio information in an audio frame buffer 70 holding the audio information to be transmitted in the next modem frame. The scanning is done to estimate the complexity or "entropy" of the audio information for that modem frame, as illustrated by block 72. This entropy estimate can be used to project the target number of bits required to deliver the desired audio quality. Using this entropy estimate on line 74, along with the quantity and priority assignments of the data in the messages in buffers 60, 62 and 64, the dynamic scheduling algorithm allocates the bits in the modem frame between data and audio.

After a number of bits has been allocated for the next modem frame, the audio encoder encodes all the audio frames (e.g. 64 audio frames) for the next modem frame and passes its result to the audio frame format converter 76. The actual number of bits consumed by the audio frame are presented to the scheduler on line 78 so it can make best use of the unused bit allocation, if any. The audio frame format converter removes any header information and unnecessary overhead and passes the resulting "stripped" audio frames to the modem frame format and assembly function block 80.

The dynamic scheduling algorithm, or scheduler, can generally operate as follows. First, if no data messages are pending, then the scheduler allocates all the capacity of the next modem frame to the compressed audio. This would often result in more bits than the target number of bits required to achieve the desired audio quality. Second, if only low priority messages are pending, then the capacity of the modem frame in excess of the target number of bits for audio is allocated to the messages (data). This should result in no loss of audio quality relative to that desired. Third, if high priority messages are pending, then the scheduler must make a compromise between the audio quality and the timely delivery of the high priority messages. This compromise can be evaluated using cost functions assigned to message latency goals versus the potential reduction in audio quality. The messages to be transmitted can be selected by sending a signal as illustrated by line 82 to a data packet multiplexer 84.

From a broadcaster's perspective, higher priority messages are associated with incremental increases in cost since the audio quality can be incrementally affected. From a data or message user perspective, the prioritization of messages can also be based upon a cost function to compensate the broadcaster for loss of audio quality. This cost function can be an actual cost. For example, the actual user cost of packet delivery can double for each increase in priority class. This can be an effective means to increase revenue from users willing to pay more than the nominal cost if the messages are perceived to be urgent. Alternatively, prioritization can be accomplished by the type of message generated by the broadcaster. In either case the prioritization is self-regulating, and higher priority messages are assigned with discretion since there is some incremental cost involved, both to the user and to the broadcaster. Of course the broadcaster will assign the rules and associated cost functions for his net benefit while providing a potentially valuable service to his users and listeners.

The modem frame format and assembly function arranges the audio frame information and data packets into a modem frame. Header information including the size and location of the audio frames, which had been removed in the audio frame format converter, are reinserted into the modem frame in a redundant, but efficient, manner. This reformatting improves the robustness of the IBOC DAB signal over the less-than-reliable radio channel. For transmission in the all-digital IBOC DAB mode, backup frames, based on data supplied on line 86, are also generated. The backup frames can provide a time diverse redundant signal to reduce the probability of an outage when the main signal fails. In normal operation, the backup frames are code-combined with the main channel to yield an even more robust transfer of information in the presence of fading. The analog signal (AM or FM) is used in place of the backup frames in the Hybrid IBOC system.

Figure 3:
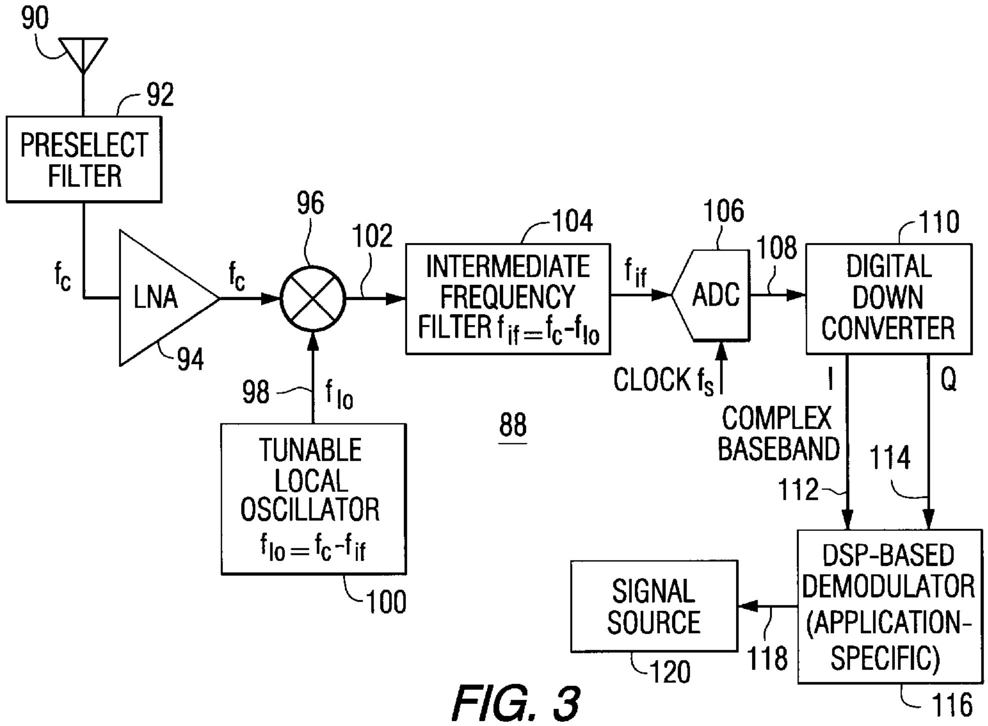
FIG. 3 is a block diagram of a receiver that can process signals in accordance with this invention.

The receiver performs the inverse of some of the functions described for the transmitter. FIG. 3 is a block diagram of a radio receiver 88 capable of performing the signal processing in accordance with this invention. The DAB signal is received on antenna 90. A bandpass preselect filter 92 passes the frequency band of interest, including the desired signal at frequency $f_c$, but rejects the image signal at $f_c-2f_{if}$ (for a low side lobe injection local oscillator). Low noise amplifier 94 amplifies the signal. The amplified signal is mixed in mixer 96 with a local oscillator signal $f_{lo}$ supplied on line 98 by a tunable local oscillator 100. This creates sum ($f_c+f_{lo}$) and difference ($f_c-f_{lo}$) signals on line 102. Intermediate frequency filter 104 passes the intermediate frequency signal $f_{if}$ and attenuates frequencies outside of the bandwidth of the modulated signal of interest. An analog-to-digital converter 106 operates using a clock signal $f_s$ to produce digital samples on line 108 at a rate $f_s$. Digital down converter 110 frequency shifts, filters and decimates the signal to produce lower sample rate in-phase and quadrature signals on lines 112 and 114. A digital signal processor based demodulator 116 then provides additional signal processing to produce an output signal on line 118 for output device 120.

Figure 4:
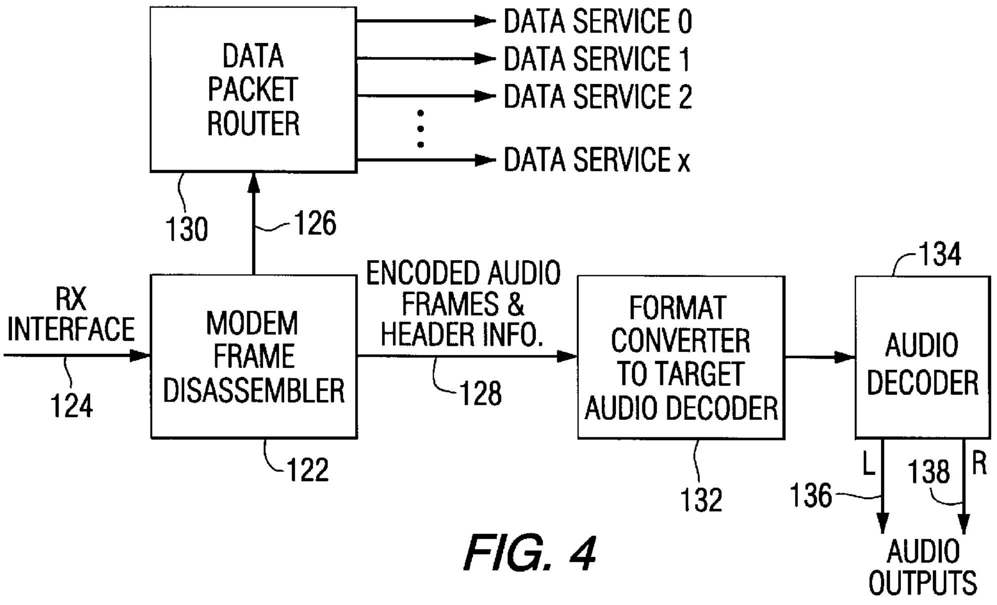
FIG. 4 is a block diagram illustrating a portion of the signal processing performed in the receiver of FIG. 3.

FIG. 4 is a block diagram illustrating the modem frame demodulating of audio and data performed in the receiver of FIG. 3. A frame disassembler 122 receives the signal to be processed on 124 and performs all the necessary operations of deinterleaving, code combining, FEC decoding, and error flagging of the audio and data information in each modem frame. The data, if any, is processed in a separate path on line 126 from the audio on line 128. The data then is routed as shown in block 130 to the appropriate data service. The data priority queuing is a function of the transmitter, not the receiver. The audio information from each modem frame is processed by a format converter 132 which arranges the audio information into an audio frame format that is compatible with the target audio decoder 134 that produces the left and right audio outputs 136 and 138.

In one type of hybrid FM DAB system an analog modulated carrier is combined with a plurality of orthogonal frequency division multiplexed (OFDM) sub-carriers placed in the region from about 129 kHz to 199 kHz away from the FM center frequency, both above and below the spectrum occupied by an analog modulated host FM carrier. In an all-digital version, the analog modulated host signal is removed, while retaining the above sub-carriers and adding additional sub-carriers in the regions from about 100 kHz to 129 kHz above and below the FM center frequency. These additional sub-carriers can transmit a backup signal that can be used to produce an output at the receivers in the event of a loss of the main, or core, signal.

The various frame formats have been carefully constructed to provide an efficient and robust IBOC DAB communications system. Moreover, the frame formatting enables important features of this design; which include time diversity, rapid channel tuning, multi-layer FEC code combining between main and backup channels, redundant header information (a form of unequal error protection), and flexibility in allocating throughput between audio frames and data messages. Many of the features of the frame formats are designed for the all-digital FM IBOC DAB system. The FM hybrid frame formats are made to be compatible with the FM all-digital formats.

Figure 5:
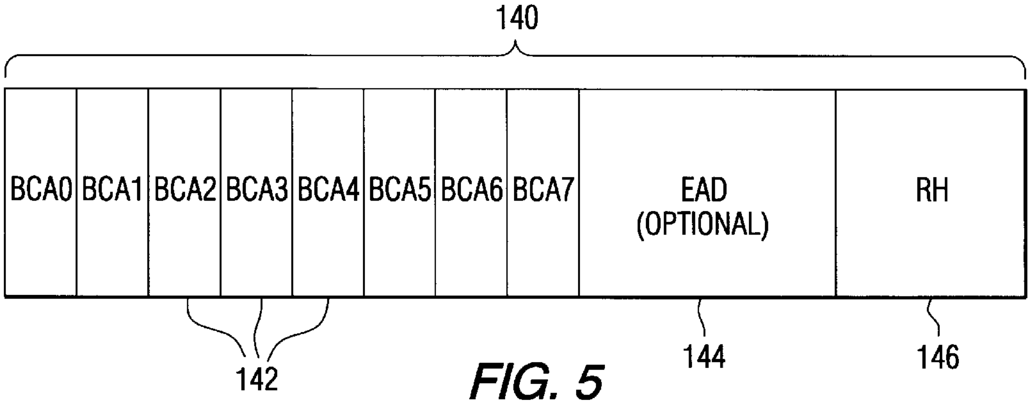
FIG. 5 is a schematic representation showing a preferred embodiment of the modem frame format used with the present invention.

As shown in FIG. 5, the main channel modem frame 140 is comprised of a set of 8 backup core audio (BCAx) fields 142, an optional enhanced audio/data (EAD) field 144 and a redundant header (RH) field 146. The main channel modem frame carries audio information for 64 audio frames, along with a dynamic data capacity. In the preferred embodiment, the size of the modem frame is 18,432 bytes after Reed-Solomon encoding. The number of input bytes for the RS(144,140), RS(144,136) and RS(144,132), coding options are 17,920 bytes, 17,408 bytes, and 16,896 bytes, respectively.

This modem frame is presented to a Reed Solomon encoder and subsequent forward error correction (FEC) and interleaving functions. The rate of the Reed Solomon encoder determines exactly how many bytes comprise the modem frame before FEC encoding. It should be noted that in the preferred embodiment, the Reed Solomon code words are encoded systematically such that the parity symbols are in front of the information symbols. This ensures that the flush byte (all zeroes) remains as the last byte presented to the inner convolutional encoder. The redundant header field is located at the end of the modem frame to ensure that it is coded with a separate Reed-Solomon code word.

Figure 6:
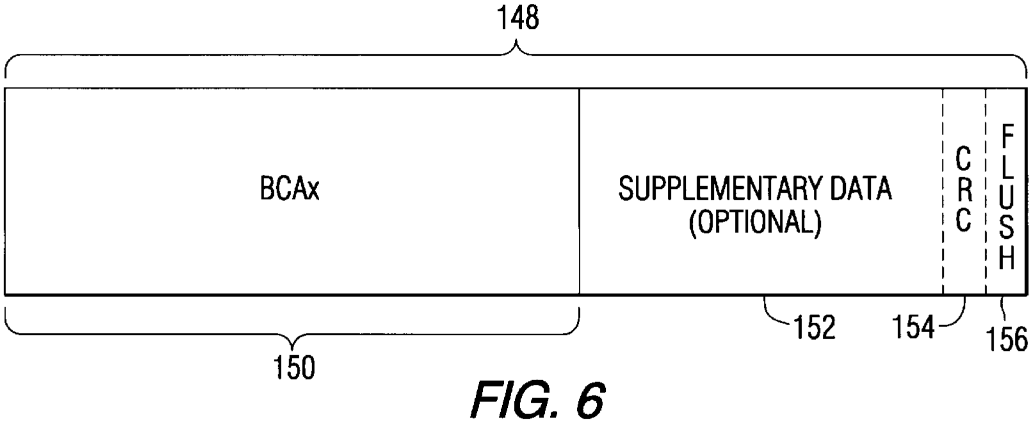
FIG. 6 is a schematic representation showing a preferred embodiment of the backup audio/supplemental frame format used with the present invention.

The format for the backup audio/supplemental frame 148 of the all-digital IBOC DAB system is shown in FIG. 6. Each backup audio/supplementary frame includes a backup audio field 150, a supplementary data field 152, a cyclic redundancy check byte 154, and a flush byte 156. The two modes of operation include the 24 kbps core audio backup mode and the 48 kbps core audio backup. Although each BCAx frame holds 8 audio fields each of variable length, the total length of the combined BCAx fields is constant.

The 8 backup core audio fields BCA0 through BCA7 of the main channel modem frame are redundant with the same fields 142 in the backup/audio supplemental frame (BAS) 148. However, the backup frames of the all-digital IBOC DAB system are transmitted several seconds after the transmission of the corresponding modem frame. The backup frames are intentionally delayed for the purpose of introducing the time-diversity feature. This diversity delay is an integer number of modem frames. In contrast, the receiver processes the backup frames as quickly as practical to enable rapid tuning. The receiver time-aligns the BCAx fields in the modem frame with the redundant BCAx fields in the backup frame by appropriately delaying the audio information in the modem frame.

After the BCAx fields in the modem frame and the BCAx fields in the backup frame have been aligned, the time-aligned BCA fields are code-combined in the receiver's convolutional decoder. In one embodiment of a transmitter using the signal processing of this invention, an outer Reed Solomon FEC is applied to the digital signal, followed by an inner convolutional FEC, prior to interleaving and subsequent transmission. It is important that the BCA fields are coded exactly in the same sequence with both the inner and outer FEC codes to enable the diversity code combining. This results in robust performance for the tuning and backup channel, even when both the modem frame and the backup audio/supplemental frames are partially corrupted. In the preferred embodiment, the BCA fields carry a core backup audio signal at either 24 kbps or 48 kbps, selectable by the broadcaster.

The backup audio/supplemental frame BASx is transmitted on the backup channel sub-carriers during each pair of interleaver blocks over the modem frame duration. The supplementary data field with cyclic redundancy check and flush bytes is transmitted only in the 24 kbps core audio backup mode. The supplementary data field is replaced with additional audio information in the 48 kbps core audio backup mode. In the preferred embodiment, the BASx frame includes 1152 bytes (after Reed Solomon encoding), in 8 Reed Solomon codewords. Each BCAx field includes 576 bytes (after Reed Solomon encoding) for the 24 kbps mode, in 4 Reed Solomon codewords, or 1152 bytes (after Reed Solomon encoding) for the 48 kbps mode, in 8 Reed Solomon codewords. The supplementary data field includes 576 bytes (after Reed Solomon encoding) for the 24 kbps mode, in 4 Reed Solomon codewords. In the 48 kbps mode, the supplementary data field is not present. The cyclic redundancy check and flush bytes are used in the 24 kbps modes, but not in the 48 kbps mode. The 24 kbps backup audio mode enables the insertion of a supplementary data field with a throughput of about 24 kbps. This field is intended for use as an independent broadcast messaging or data packet delivery service. The framing at this level simply provides the channel capacity for the supplementary data, which would have its own formatting/protocol within the supplementary data field.

Figure 7:
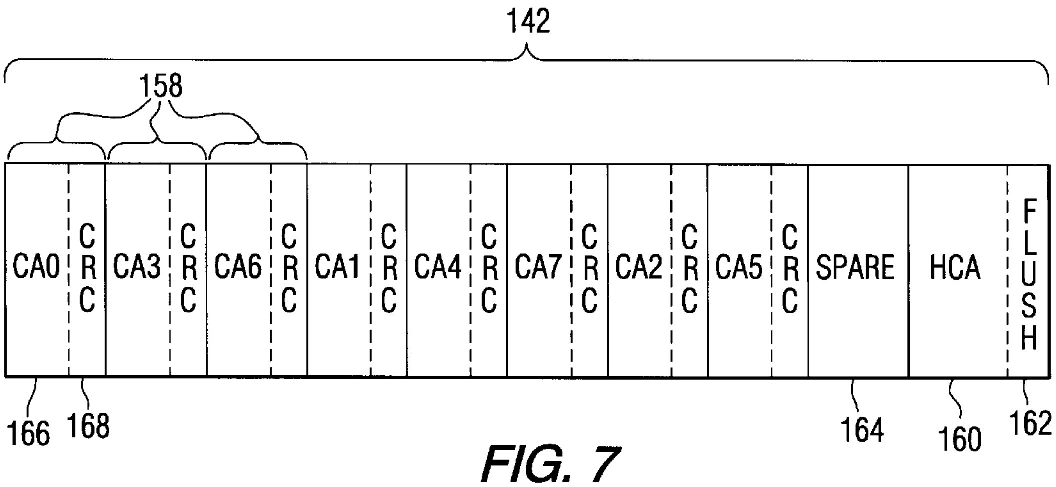
FIG. 7 is a schematic representation showing a preferred embodiment of the backup core audio frame of the modem frame format used with the present invention.

The format for the backup core audio field (BCAX) 142 is presented in FIG. 7. The length of this field is determined by the choice between two backup modes. A 24 kbps backup mode is intended to provide a monophonic backup audio signal with an audio bandwidth of about 6 kHz, while audio signal of a 48 kbps backup mode is stereo or mono with a bandwidth of about 10 kHz. The BCAx field holds 8 audio frames 158 each of variable length, a header field (HCA) 160, a flush byte 162, and possibly a spare field 164. The spare field includes any bytes remaining after audio frame allocation. Each audio frame includes a core audio frame (CAx) 166 and a cyclic redundancy check byte 168. However, the total length of the BCAx field 142 is constant. Therefore, the audio encoder is allotted a fixed number of bytes to encode each group of 8 core audio frames (CAx).

One of the backup core audio fields BCAx (x=0 through x=7) is redundantly transmitted on the backup channel sub-carriers over each interleaver block (0 through 7) of the modem frame. The 8 BCAx frames are also transmitted as part of the modem frame. In the preferred embodiment, each BCAx field includes 576 bytes (after Reed Solomon encoding) for the 24 kbps mode, in 4 Reed Solomon codewords, and 1152 bytes (after Reed Solomon encoding) for the 48 kbps mode, in 8 codewords. The core audio frame CAx holds variable length audio frame number of bytes (before Reed Solomon encoding) in CAx fields indicated in the header CAx fields ordered for improved error concealment. A one byte (before Reed Solomon encoding) cyclic redundancy check is included, as is a one byte (before Reed Solomon encoding) flush field to flush the Viterbi decoder. The HCA header is 8 bytes (before Reed Solomon encoding), and indicates the size of the each of the 8 CAx fields.

Figure 8:
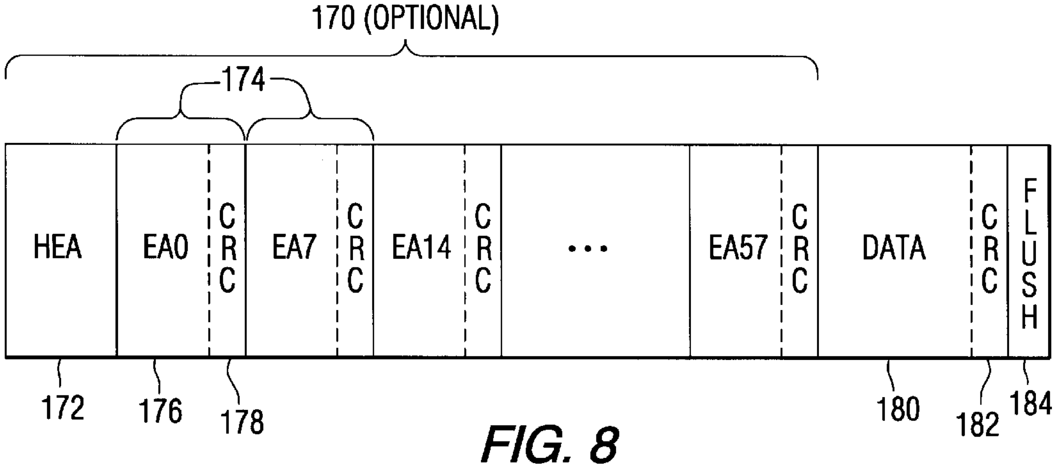
FIG. 8 is a schematic representation showing a preferred embodiment of the enhanced audio/data field of the modem frame format used with the present invention.

The enhanced audio/data (EAD) 170 field format is presented in FIG. 8. The EAD is transmitted within the modem frame and holds audio enhancement information for 64 audio frames. The EAD includes a header field 172, a plurality of enhanced audio fields 174, each including an enhanced audio portion (EAx) 176 and a cyclic redundancy check byte 178, a data field 180, another cyclic redundancy check byte 182 and a flush byte 184. The preferred embodiment of the EAD contains 13680 bytes (after RS encoding) for 24 kbps B/U mode, with 95 RS codewords, and 9072 bytes (after RS encoding) for 48 kbps B/U mode, with 63 codewords. A 64 byte (before RS encoding) header 166 indicates the size of each of 64 EAx fields 168. The EAx fields hold audio enhancement information to increase the core quality/rate. The number of bytes (before RS encoding) in each EAx field, is indicated in the header, x=0, 7, 14, . . . (7*k mod 64), for k=0 to 63, ordered for error concealment. Each enhanced audio field includes a data portion 170, and a cyclic redundancy check byte 172. If the scheduler determines that bytes are available for data, the data can be carried in data field 174, with a cyclic redundancy check byte 178. A one byte (before RS encoding) zero flush field 178 is used to flush the Viterbi decoder. The EAD field carries the additional audio information such that, when combined with the core audio fields of the corresponding modem frame, provides virtual compact disk (CD) quality sound.

Figure 9:
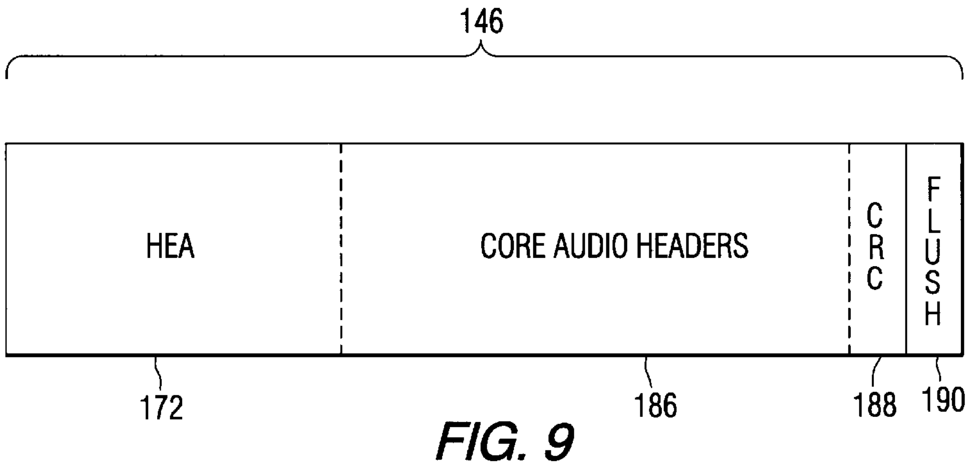
FIG. 9 is a schematic representation showing a preferred embodiment of the redundant header field of the modem frame format used with the present invention.

The enhanced audio/data field includes a header field 172, a plurality of enhanced Audio Fields 174, each including an audio portion (EAx) 176 and a cyclic redundancy check byte 178, a data field 180, another cyclic redundancy check byte 182, and a flush byte 184. The redundant header (RH) field format 146 is presented in FIG. 9. This field carries redundant information regarding the sizes (or locations) of the audio fields. It includes redundant header field (HEA) 172, core audio headers (HCAx) 186, a cyclic redundancy check byte 188, and a flush byte 190. The redundant header field carries header information for the 64 audio frames within the modem frame. In the preferred embodiment, the redundant header field includes 144 bytes (after Reed Solomon encoding), in one codeword. The HEA includes 64 bytes (before Reed Solomon encoding) indicating the size of each of the 64 EAx fields, and is redundant with the HEA field in the EAD frame. The core audio header includes 64 bytes (before Reed Solomon encoding) in 8 headers duplicated from BCA's. A single byte cyclic redundancy check is included over all headers. The flush field includes 15-P zero bytes (before Reed Solomon encoding), where P is the number of parity bytes, to flush the Viterbi decoder. This redundancy provides additional protection against corruption of the important header information. The enhanced audio headers (HEA) 166 are transmitted in two locations within the modem frame (i.e., the RH field and the 8 EAD field). The core audio headers 182 are transmitted in three locations (i.e., the RH and the 8 HCA fields within the modem frame, in addition to the 8 HCA fields in the backup audio supplemental (BAS) frames of the all-digital IBOC DAB system). The HEA header information includes 64 bytes (before RS encoding) indicating the size of each of the 64 EAx fields redundant with the HEA field in the EAD frame. The core audio headers include 64 bytes (before RS encoding), with eight headers duplicated from the BCAs. The RH field includes 144 bytes after RS encoding, with one RS codeword. The RH Field also includes a cyclic redundancy check byte 184 and a flush field 186. The number of bytes of the flush field is a function of the number of parity bytes (P) in the Reed-Solomon coding. Specifically the number of flush bytes equals 15-P.

Figure 10:
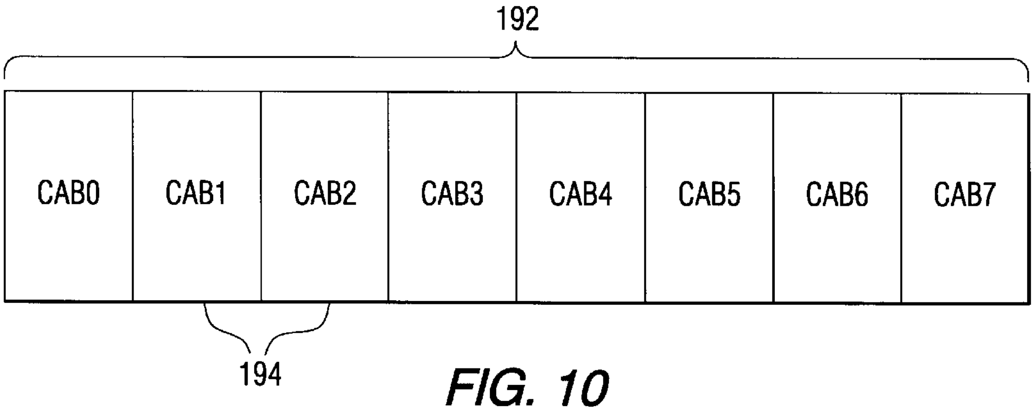
FIG. 10 is a schematic representation showing a preferred embodiment of the core modem frame format used with the present invention for use in an AM DAB system.

In an embodiment of the invention particularly applicable to AM DAB systems, the data is segregated into Core Data or Enhancement Data, depending upon the desired coverage requirements. The AM DAB Modem Frame 192 illustrated in FIG. 10 includes a set of 8 Backup Core Audio fields 194, an Enhanced Audio/Data field 196 and a Redundant Header field 198, as shown in the diagram of FIG. 10. Each Backup Core Audio field includes a group of 4 Core Audio Frames, where each BCA field is allocated a fixed maximum size. The composite Modem Frame is presented to the CPTCM Encoder and subsequent interleaving functions.

Figure 11:
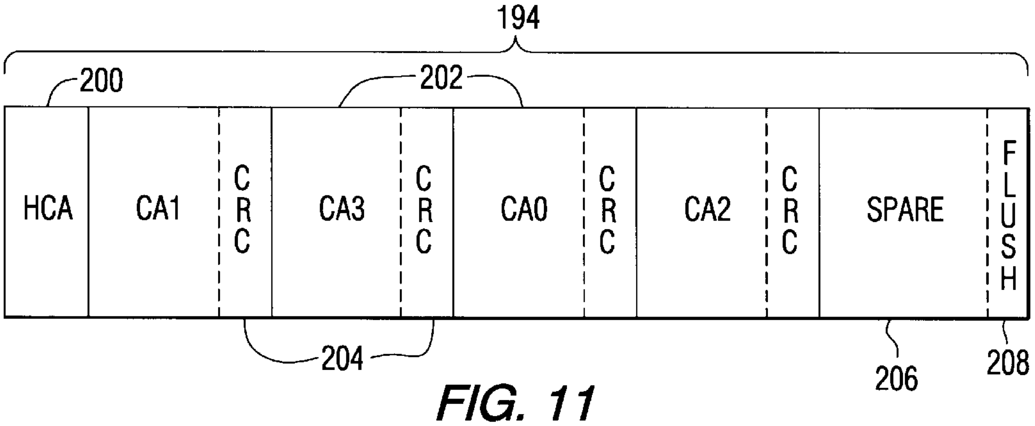
FIG. 11 is a schematic representation showing a preferred embodiment of the core audio block frame format used with the present invention for use in an AM DAB system.

The format for the Core Audio Block 194 of the Core Modem is presented in FIG. 11. Each CAB includes a header 200, four Core Audio frames 202, each with a cyclic redundancy check byte 204, a spare block 206, and a flush field 208. The eight CABx frames are transmitted as part of the core modem frame. In the preferred embodiment, each CABx field is 460 bytes before coding. The HCA header is four bytes, indicating the size of each of the four CAx fields. The core audio frame CAx holds a variable length audio frame number of bytes in CAx indicated in the header. CRC is a 1-byte cyclic redundancy check. Block 206 represents spare bytes remaining (if any) after audio frame allocation. The flush block 208 is six bits of zero data used to flush the Viterbi decoder.

The Audio Encoder of FIG. 3 is allocated a number of bits for the next Modem Frame (Core or Enhancement). The Audio Encoder encodes all the Audio Frames (e.g. 32 Audio Frames) for the next Modem Frame and passes its result to the Audio Frame Format Converter.

The AM DAB Core Modem format carries core audio information for 32 audio frames, along with a dynamic data capacity. The Core Modem Frame is comprised of time-diverse main and backup components. In the preferred embodiment, the size of the Core Modem Frame is 30,000 bits (3750 bytes) before coding. CABx (x=0 to x=7) represent the core audio blocks CSB0 through CSB7 of 460 bytes each.

The eight Core Audio fields CAB0 through CAB7 of the Modem Frame are transmitted redundantly as time diverse Main and Backup components. These Main and Backup components are created in the FEC coding and interleaving process. The Backup component of the All-Digital IBOC system are transmitted several seconds after the transmission of the corresponding Main component of the Core Modem Frame. The Backup component is intentionally delayed for the purpose of introducing the time-diversity feature. This diversity delay is an integer number of Core Modem Frames (e.g. 3). In contrast, the receiver processes the Backup component as quickly as practical to enable rapid tuning. The receiver deinterleaves the Backup and Main components of the Core Modem Frame such that these components, when available, are code-combined after taking advantage of the diversity gain and metric estimation.

Figure 12:
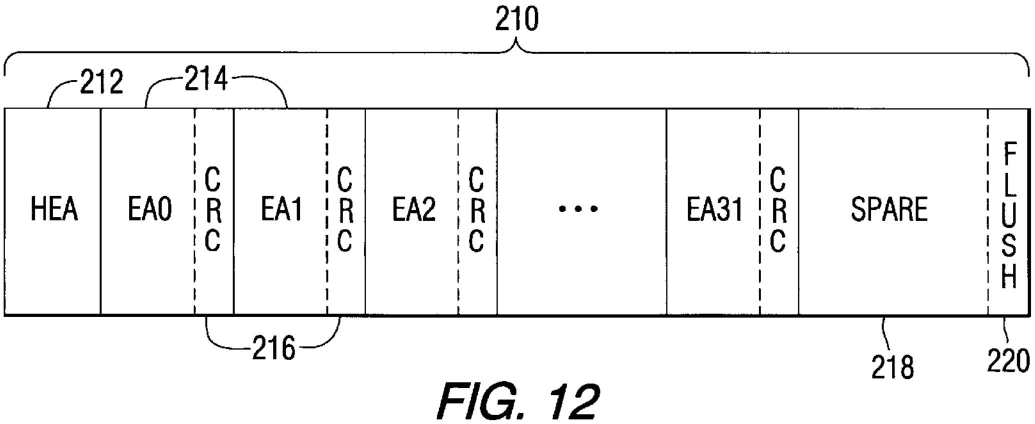
FIG. 12 is a schematic representation showing a preferred embodiment of the enhanced modem frame format used with the present invention for use in an AM DAB system.

The Enhancement Modem Frame (EMF) 210 format is presented in FIG. 12. Each EMF frame includes a header 212, a plurality of Enhanced Audio fields (EAx), each having a cyclic redundancy byte 216, a spare block 218, and a flush field 220. This frame carries the additional audio information such that, when combined with the Core Audio of the corresponding Core Modem Frame, provides higher audio quality than the Core alone.

The enhancement mode frame holds the audio enhancement information for 32 audio frames, plus data, if any. In the preferred embodiment, the enhancement modem frame holds 22,800 bits (3360 bytes). The HEA 212 header contains 32 bytes, indicating the size of each of the 32 EAx fields. The EAx fields hold enhancement audio information to increase the core audio quality, and are of variable size. A one bit cyclic redundancy check is provided. Block 218 contains any spare bytes remaining after audio frame allocation. A one byte flush field of zeros is included to flush the Viterbi decoder.

The scheduler orders the incoming prioritized and packetized messages based upon some predefined rules. The simplest algorithm would simply place the highest priority message packets in the front of the queue in chronological order for each priority class. This algorithm would guarantee that higher priority messages would be transmitted before any lower priority messages waiting in the queue, and the chronological order would ensure fairness within each priority class. It also ensures that the highest priority message class will be transmitted with the shortest possible delay of any conceivable scheduling algorithm. However, this particular scheduling algorithm does not ensure that messages would be delivered within guaranteed times for each priority class. Moreover, it is possible for a message of any priority other than the highest to be in the queue indefinitely as new highest priority messages continue to be generated.

The various frame formats have been carefully constructed to provide an efficient and robust AM IBOC DAB communications system. Moreover, the frame formatting enables important features of this design, which include time diversity, rapid channel tuning, multi-layer FEC code combining between main and backup channels, and flexibility in allocating throughput between audio frames and data messages. Many of the features of the frame formats are designed for the All-Digital AM IBOC DAB system. The AM Hybrid Frame formats are made to be compatible with the AM All-Digital formats.

Figure 13:
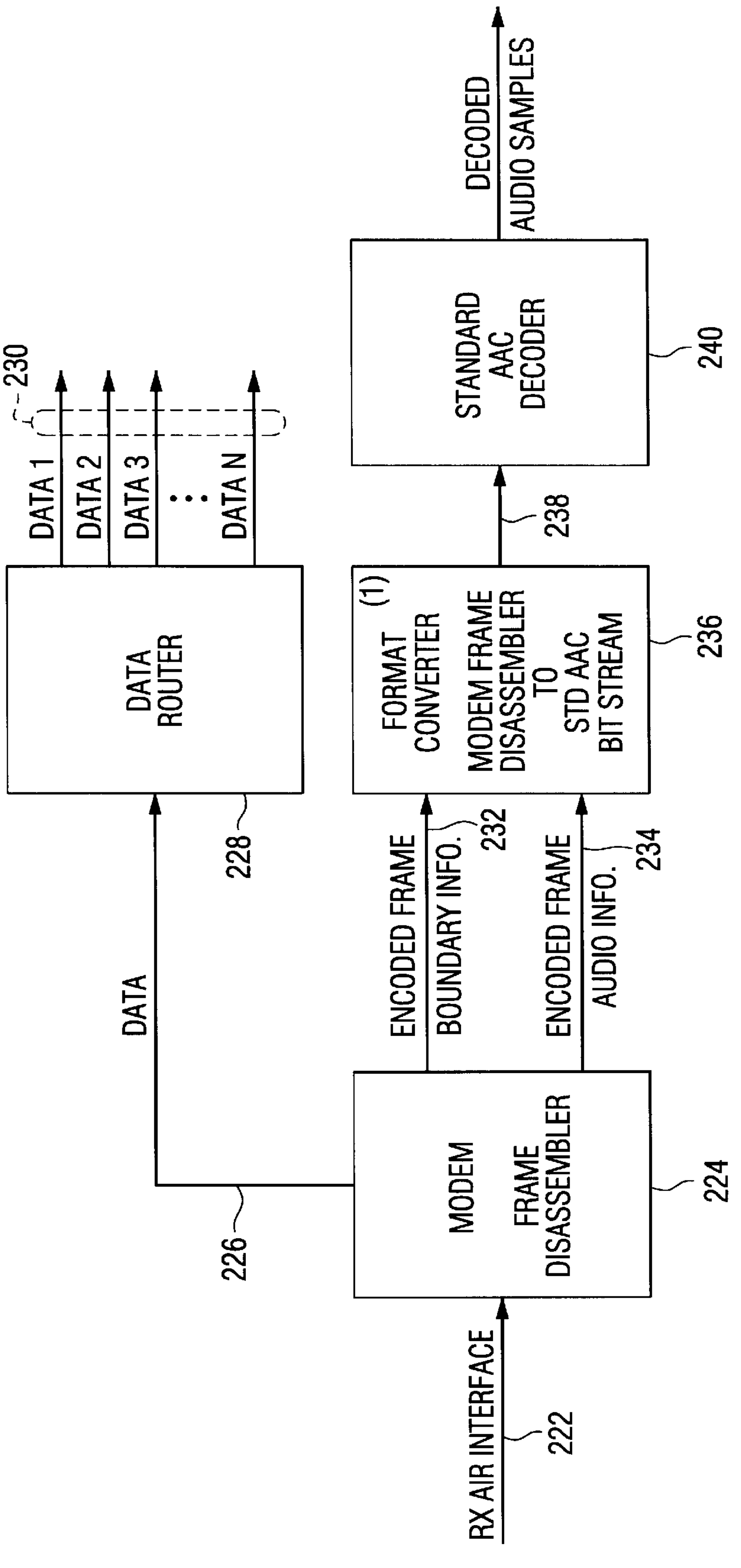
FIG. 13 is a block diagram of the data signal interfaces that may be used when practicing this invention in a receiver for use in a digital audio broadcasting system.

FIG. 13 is a block diagram of the advanced audio coding (AAC) IBOC DAB interfaces in a receiver constructed in accordance with this invention. The incoming signal is provided from the receiver air interface on line 222. A modem and frame disassembler 224 separates the data from the encoded frame boundary information and the audio information. The data are sent on line 226 to a data router 228 that sends the data to various destinations on line 230. The boundary and audio information are supplied on lines 232 and 234 to a format converter 236 that converts the signal into a standard AAC bit stream on line 238. Then a standard AAC decoder 240 decodes the audio samples.

Figure 14:
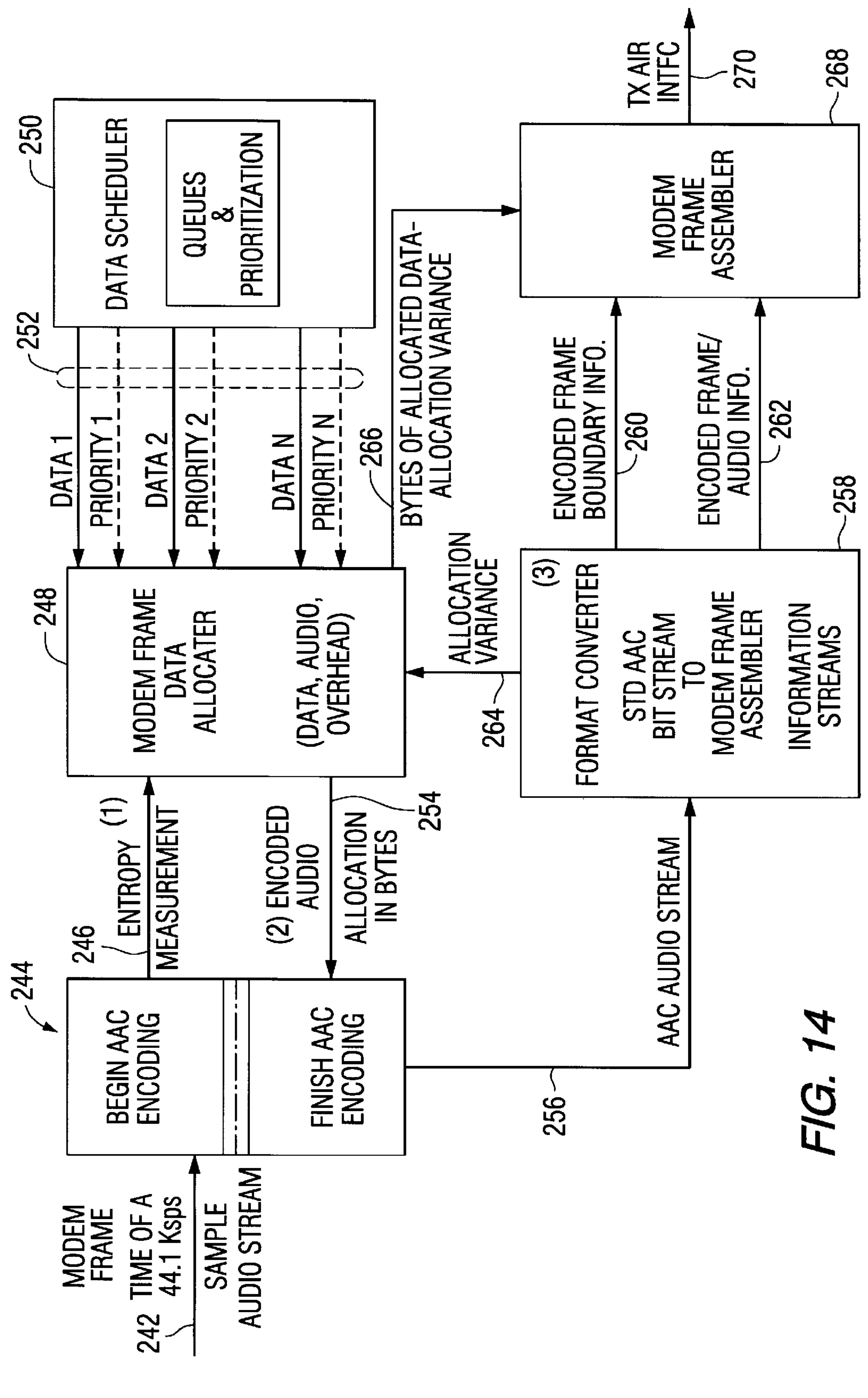
FIG. 14 is a block diagram of a data signal interface that may be used when practicing the invention in a transmitter in a digital audio broadcasting system.

FIG. 14 is a block diagram of an AAC/IBOC DAB interface in a transmitter constructed in accordance with this invention. A modem frame audio stream is supplied on line 242 to an AAC encoder 244. The AAC encoder initially produces an entropy signal on line 246 for modem frame data allocater 248. A data scheduler 250 supplies data at various priorities to the modem frame data allocater on lines 252. The modem frame data allocater 248, produces a bit allocation signal on line 254. Then the AAC encoder produces an AAC audio bit stream on line 256. Format converter 258 converts the standard AAC bit stream to encoded frame boundary information on line 260, and encoded frame audio information on line 262. An allocation variance signal is also provided on line 264, permitting the modem frame data allocater to allocate data on line 266 in accordance with the allocation variance signal. The modem frame assembler 268 receives the encoded frame boundary information, the encoded frame audio information, and the data allocated in accordance with the allocation variance signal to produce the modem frame that is output to the air interface on line 270.

The scheduler orders the incoming prioritized and packetized messages based upon some predefined rules. The simplest algorithm would simply place the highest priority message packets in the front of the queue in chronological order for each priority class. This algorithm would guarantee that higher priority messages would be transmitted before any lower priority messages waiting in the queue, and the chronological order would ensure fairness within each priority class. It also ensures that the highest priority message class will be transmitted with the shortest possible delay of any conceivable scheduling algorithm. However, this particular scheduling algorithm does not ensure that messages would be delivered within guaranteed times for each priority class. Moreover, it is possible for a message of any priority other than the highest to be in the queue indefinitely as new highest priority messages continue to be generated.

More complicated dynamic scheduling algorithms could be employed that guarantee delivery times for each priority class. A flow control mechanism may also prevent the acceptance of the message in the queue of a priority class when it is full. At least the user knows whether or not the delivery time is guaranteed. If a particular priority class is full, the user could schedule his message in another priority class with a different cost. One advantage of this algorithm is the mechanism that prevents hang-up of lower priority messages when the higher priority messages are constantly being generated. In addition, the user pays only for the service he receives. To summarize, there is considerable flexibility is choosing a scheduling algorithm with associated cost functions to enable the broadcaster to optimize his services.

This invention provides a robust method for the multiplexing and transmission of compressed digital audio frames along with digital data packets within a modem frame in In-Band On-Channel (IBOC) Digital Audio Broadcasting (DAB) systems. This method is designed to have minimum adverse impact on the digital audio quality while maximizing data throughput for multiple messages with different priority assignments. The invention provides a flow control mechanism where a compromise is optimized, given assigned priorities of classes of message packets versus audio quality. A scheduling algorithm for the various packet priorities multiplexes the data packets along with the encoded audio packets during assembly of the modem frame. Additionally, audio frame format converters are used to enable transmission of reformatted generic compressed audio frames in the DAB modem frame in a manner that is transparent to the audio decoder. However some restrictions are placed on the audio encoder. These encoder restrictions are related to the allotment of bits to various groupings of audio frames. The new frame formatting enables time diversity transmission of audio information as well as FEC code combining of the time-diverse audio segments in an all-digital system. This time diversity feature and its compatibility are also maintained in the hybrid system, which uses the analog signal as a time-diverse backup, as shown in U.S. patent application Ser. No. 08/947,902, filed Oct. 9, 1997, assigned to the assignee of this invention, now U.S. Pat. No. 6,178,317.

The present invention permits the use of a standard advanced audio coding (AAC) encoder in a digital audio broadcasting transmitter. In the illustrated preferred embodiment of the transmitter, the custom modem frame formatting is performed outside of the encoder. Similarly, the preferred embodiment of the receiver disassembles the modem frame prior to using a standard AAC decoder to decode the audio samples.

While the present invention has been described in terms of its preferred embodiment, it will be understood by those skilled in the art that various modifications can be made to the disclosed embodiment without departing from the scope of the invention as set forth in the claims.

What is claimed is:

1. A method for transmission of compressed data for a digital audio broadcasting system comprising the steps of:

receiving digital information representative of an audio signal;

estimating a number of bits to be allocated to said digital information in a modem frame;

encoding said digital information within the estimated number of bits to produce encoded data;

adding bits corresponding to digital messages to said encoded information to form a composite modem frame;

formatting said composite modem frame bits to produce formatted composite modem frame bits; and transmitting the formatted composite modem frame bits.

2. The method of claim 1, wherein the step of estimating the number of bits to be allocated to encode said digital information in a modem frame, comprises the steps of:

storing said digital information in a buffer; and estimating the entropy of said digital information.

3. The method of claim 1, further comprising the step of:

removing selected overhead bits from said encoded data.

4. The method of claim 1, wherein the step of adding bits corresponding to digital messages to said encoded information to form a composite modem frame, comprises the steps of:

prioritizing a plurality of said digital messages; and selecting bits of said digital messages having the highest priority to be added to available bits in said modem frame.

5. The method of claim 1, wherein the step of formatting said composite modem frame bits to produce formatted composite modem frame bits, comprises the step of:

inserting redundant frame overhead data into said composite modem frame.

6. The method of claim 1, further comprising the step of:

multiplexing said digital messages and inserting the multiplexed digital messages into said composite frame data.

7. The method of claim 1, wherein said modem frame includes a fixed number of audio frames, said audio frames having variable lengths.

8. The method of claim 1, wherein the step of encoding said digital information within the estimated number of bits to produce encoded data comprises the step of:

arranging the bits of digital information into a plurality of backup frames and an enhanced audio frame.

9. The method of claim 8, wherein the bits of digital information in said backup frames and said enhanced audio frame are arranged to be subsequently code combined.

10. A transmitter for a digital audio broadcasting system comprising:

means for receiving digital information representative of an audio signal;

means for estimating the number of bits to be allocated to said digital information in a modem frame;

means for encoding said digital information within the estimated number of bits to produce encoded data;

means for adding bits corresponding to digital messages to said encoded information to form a composite modem frame;

means for formatting said composite modem frame bits to produce formatted composite modem frame bits; and means for transmitting the formatted composite modem frame bits.

11. The transmitter of claim 10, wherein the means for estimating the number of bits to be allocated to encode said digital information in a modem frame, comprises:

means for storing said digital information in a buffer; and means for estimating the entropy of said digital information.

12. The transmitter of claim 10, further comprising:

means for removing selected bits from said encoded data.

13. The transmitter of claim 10, wherein the means for adding bits corresponding to digital messages to said encoded information to form a composite modem frame, comprises:

means for prioritizing a plurality of said digital messages; and means for selecting bits of said digital messages having the highest priority to be added to available bits in said modem frame.

14. The transmitter of claim 10, wherein the means for formatting said composite modem frame bits to produce formatted composite modem frame bits, comprises:

means for inserting redundant frame overhead data into said composite modem frame.

15. The transmitter of claim 10, further comprising:

means for multiplexing said digital messages and inserting the multiplexed digital messages into said composite frame data.

16. The transmitter of claim 10, wherein said modem frame includes a fixed number of audio frames, said audio frames having variable lengths.

17. The transmitter of claim 10, wherein the means for encoding said digital information within the estimated number of bits to produce encoded data comprises:

means for arranging backup frames of said digital information for transmission within said composite modem frame.

18. The transmitter of claim 17, wherein the bits of digital information in said backup frames and said enhanced audio frame are arranged to be subsequently code combined.

19. A transmitter for a digital audio broadcasting system comprising:

an input for receiving digital information representative of an audio signal;

a processor for estimating the number of bits to be allocated to said digital information in a modem frame, for encoding said digital information within the estimated number of bits to produce encoded data, for adding bits corresponding to digital messages to said encoded information to form a composite modem frame, and for formatting said composite modem frame bits to produce formatted composite modem frame bits; and an antenna for transmitting the formatted composite modem frame bits.

20. The transmitter of claim 19, wherein the processor estimates the entropy of said digital information.

21. The transmitter of claim 19, wherein the processor removes selected bits from said encoded data.

22. The transmitter of claim 19, wherein the processor prioritizes a plurality of said digital messages and selects bits of said digital messages having the highest priority to be added to available bits in said modem frame.

23. The transmitter of claim 19, wherein the processor inserts redundant frame overhead data into said composite modem frame.

24. The transmitter of claim 19, further comprising:

a multiplexer for multiplexing said digital messages and inserting the multiplexed digital messages into said composite frame data.

25. The transmitter of claim 19, wherein said modem frame includes a fixed number of audio frames, said audio frames having variable lengths.

26. The transmitter of claim 19, wherein the processor arranges backup frames of said digital information for transmission within said composite modem frame.

27. The transmitter of claim 26, wherein the bits of digital information in said backup frames and said enhanced audio frame are arranged to be subsequently code combined.

28. The transmitter of claim 19, wherein the processor is a programmable digital signal processor.

29. The method of claim 1, wherein the steps of estimating a number of bits to be allocated to said digital information in a modem frame, encoding said digital information within the estimated number of bits to produce encoded data, and receiving digital messages, adding bits corresponding to digital messages to said encoded information to form a composite modem frame, and formatting said composite modem frame bits to produce formatted composite modem frame bits, are performed by a digital signal processor.

30. The method of claim 29, wherein the digital signal processor is a software programmable digital signal processor.

31. A method for transmitting and receiving compressed data for a digital audio broadcasting system comprising the steps of:

receiving digital information representative of an audio signal;

estimating a number of bits to be allocated to said digital information in a modem frame;

encoding said digital information within the estimated number of bits to produce encoded data, and receiving digital messages;

adding bits corresponding to digital messages to said encoded information to form a composite modem frame;

formatting said composite modem frame bits to produce formatted composite modem frame bits;

transmitting the formatted composite modem frame bits;

receiving the modem frame bits; and producing an output in response to the modem frame bits.

32. The method of claim 31, wherein the step of estimating the number of bits to be allocated to encode said digital information in a modem frame, comprises the step of:

estimating the entropy of said digital information.

33. The method of claim 31, further comprising the step of:

removing selected overhead bits from said encoded data.

34. The method of claim 31, wherein the step of adding bits corresponding to digital messages to said encoded information to form a composite modem frame, comprises the steps of:

prioritizing a plurality of said digital messages; and selecting bits of said digital messages having the highest priority to be added to available bits in said modem frame.

35. The method of claim 31, wherein the step of formatting said composite modem frame bits to produce formatted composite modem frame bits, comprises the step of:

inserting redundant frame overhead data into said composite modem frame.

36. The method of claim 31, further comprising the step of:

multiplexing said digital messages and inserting the multiplexed digital messages into said composite frame data.

37. The method of claim 31, wherein said modem frame includes a fixed number of audio frames, said audio frames having variable lengths.

38. The method of claim 31, wherein the step of encoding said digital information within the estimated number of bits to produce encoded data comprises the step of:

arranging the bits of digital information into a plurality of backup frames and an enhanced audio frame.

39. The method of claim 38, wherein the bits of digital information in said backup frames and said enhanced audio frame are arranged to be subsequently code combined.

* * * * *

UNITED STATES PATENT AND TRADEMARK OFFICE

CERTIFICATE OF CORRECTION

PATENT NO. : 6,721,337 B1
APPLICATION NO. : 09/382716
DATED : April 13, 2004
INVENTOR(S) : Kroeger et al.

It is certified that error appears in the above-identified patent and that said Letters Patent is hereby corrected as shown below:

Column 3, Line 60
"patent application" should read -- Patent Application --

Column 6, Line 33
"design;" should read -- design, --

Column 12, Line 18
"patent application" should read -- Patent Application --

Signed and Sealed this

Eleventh Day of July, 2006

JON W. DUDAS
*Director of the United States Patent and Trademark Office*